US012705554B2

(12) United States Patent
Hanzaki et al.

(10) Patent No.: US 12,705,554 B2
(45) Date of Patent: Aug. 11, 2026

(54) PLATOONING FORMATION PATTERN PROPOSAL METHOD, PLATOONING FORMATION PATTERN PROPOSAL DEVICE, AND PLATOONING FORMATION PATTERN PROPOSAL SYSTEM

(71) Applicant: DENSO CORPORATION, Kariya-city (JP)

(72) Inventors: Makiko Hanzaki, Kariya-city (JP); Hajime Nomura, Kariya-city (JP); Kei Okada, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 113 days.

(21) Appl. No.: 18/339,271

(22) Filed: Jun. 22, 2023

(65) Prior Publication Data

US 2023/0419203 A1 Dec. 28, 2023

(30) Foreign Application Priority Data

Jun. 28, 2022 (JP) ................................ 2022-103582

(51) Int. Cl.
*G06Q 10/06* (2023.01)
*G06Q 10/0631* (2023.01)

(52) U.S. Cl.
CPC ............................. *G06Q 10/06311* (2013.01)

(58) Field of Classification Search
CPC ..................................................... G06Q 10/06
See application file for complete search history.

(56) References Cited

U.S. PATENT DOCUMENTS 11,367,358 B1 * 6/2022 Vemuri .................... G08G 1/22
2015/0100192 A1 * 4/2015 Lee ......................... G08G 1/22 701/23
2020/0152067 A1 * 5/2020 Salles .................... G07C 5/008
2020/0193839 A1 * 6/2020 Kamata ................. G06F 3/0482
2020/0320806 A1 * 10/2020 Manchanda ........... G08G 1/202
2021/0041893 A1 * 2/2021 Matsumoto .......... G05D 1/0293
2022/0207437 A1 * 6/2022 Aparicio Martínez ..................... G06Q 50/40
2023/0154336 A1 * 5/2023 Cho .................... B60W 30/165 701/24

FOREIGN PATENT DOCUMENTS

JP 2014-153950 A 8/2014
JP 2020-052555 A 4/2020
JP 2020-052556 A 4/2020

OTHER PUBLICATIONS

U.S. Appl. No. 18/339,295, filed Jun. 22, 2023, Hanzaki et al.

* cited by examiner

*Primary Examiner* — Nga B Nguyen
(74) *Attorney, Agent, or Firm* — Harness, Dickey & Pierce, P.L.C.

(57) ABSTRACT

By a platooning formation pattern proposal method, a platooning formation pattern proposal device, or a platooning formation pattern proposal system, a formation pattern of platooning is proposed when vehicles perform the platooning, information related to the formation pattern is collected, information in a predetermined index is extracted from the collected information, a score of the index is calculated, a recommendation formation pattern is proposed.

7 Claims, 15 Drawing Sheets

FIG. 9

| PLT ORDER | POINT | PERSON A | PERSON B | PERSON C |
|---|---|---|---|---|
| 1ST REQUEST | 1 | 1ST | 2ND | 1ST |
| 2ND REQUEST | 0 | 2ND | 3RD | 3RD |
| 3RD REQUEST | −1 | 3RD | 1ST | 2ND |

| DEPARTURE TIME | POINT | PERSON A | PERSON B | PERSON C |
|---|---|---|---|---|
| 1ST REQUEST | 1 | 9:00 | 10:00 | 9:00 |
| 2ND REQUEST | 0 | 10:00 | 11:00 | 11:00 |
| 3RD REQUEST | −1 | 11:00 | 9:00 | 10:00 |

| STOPOVER SA | POINT | PERSON A | PERSON B | PERSON C |
|---|---|---|---|---|
| 1ST REQUEST | 1 | SHIZUOKA | NO | AICHI |
| 2ND REQUEST | 0 | AICHI | NO | KANAGAWA |
| 3RD REQUEST | −1 | KANAGAWA | NO | SHIZUOKA |

| ROUTE | POINT | PERSON A | PERSON B | PERSON C |
|---|---|---|---|---|
| 1ST REQUEST | 1 | TOMEI | NO | SHIN-TOMEI |
| 2ND REQUEST | 0 | SHIN-TOMEI | NO | GN ROAD |
| 3RD REQUEST | −1 | GN ROAD | NO | TOMEI |

| PLT ORDER | FACTOR SCORE |
|---|---|
| ABC | 2 |
| ACB | 0 |
| BAC | −1 |
| BCA | −3 |
| CAB | 1 |
| CBA | 1 |

| DEPARTURE TIME | FACTOR SCORE |
|---|---|
| 9:00 | 1 |
| 10:00 | 0 |
| 11:00 | −1 |

| STOPOVER SA | FACTOR SCORE |
|---|---|
| SHIZUOKA | 0 |
| AICHI | 1 |
| KANAGAWA | −1 |

| ROUTE | FACTOR SCORE |
|---|---|
| TOMEI | 0 |
| SHIN-TOMEI | 1 |
| GN ROAD | −1 |

FIG. 10

| PLT ORDER | FACTOR SCORE |
| --- | --- |
| ABC | 1 |
| ACB | −2 |
| BAC | 1 |
| BCA | −3 |
| CAB | 3 |
| CBA | 2 |

| ROUTE | FACTOR SCORE |
| --- | --- |
| TOMEI | 1 |
| SHIN-TOMEI | 0 |
| GN ROAD | −1 |

| VEHICLE TYPE | FACTOR SCORE |
| --- | --- |
| SAME VE TYPE COMB | 1 |
| DIFFERENT VE TYPE COMB | −1 |

FIG. 11

| INDEX EXAMPLE | FACTOR EXAMPLE |
|---|---|
| FUEL CONSUMPTION | ·PLATOON ORDER<br>·VEHICLE TYPE<br>·ROUTE |
| REQUEST | ·PLATOONING START TIME<br>·PLATOONING START DISTANCE<br>·PLATOONING DISTANCE<br>·ROUTE DESIGNATION<br>·DEPARTURE TIME/ARRIVAL TIME<br>·DRIVER BURDEN REDUCTION<br>·TRAVEL SPEED |
| PERSONNEL COST | ·MANNED/UNMANNED PLT PARTICIPATION VE, PERSONNEL COST REDUCTION DEGREE |
| SAFETY | ·EXISTENCE OR NON-EXISTENCE OF SAFETY FUNCTION, SAFETY DRIVING CONTRIBUTION DEGREE |

FIG. 12

| TRAVEL SPEED | FACTOR SCORE |
|---|---|
| SAME TRAVEL SPEED ZONE | 1 |
| DIFFERENT TRAVEL SPEED ZONE | −1 |

FIG. 13

| PERSONNEL COST REDUCTION | FACTOR SCORE |
|---|---|
| UNMANNED | 1 |
| MANNED | −1 |

FIG. 14

| SAFETY DRIVING CONTRIBUTION DEGREE | FACTOR SCORE |
|---|---|
| WITH SAFETY FUNCTION | 1 |
| WITHOUT SAFETY FUNCTION | −1 |

| | 1ST | 2ND | 3RD | ... | REQUEST PLT ORDER SCORE | FUEL CONSUMPTION PLT ORDER SCORE |
|---|---|---|---|---|---|---|
| PLT CONFIGURATION PROPOSAL 1 | VEHICLE A | VEHICLE B | VEHICLE C | ... | 30 | 10 |
| PLT CONFIGURATION PROPOSAL 2 | VEHICLE C | VEHICLE A | — | ... | 0 | 0 |
| PLT CONFIGURATION PROPOSAL 3 | VEHICLE G | VEHICLE A | VEHICLE F | ... | 40 | 60 |
| PLT CONFIGURATION PROPOSAL 4 | VEHICLE C | VEHICLE D | — | ... | 50 | 20 |
| ... | ... | ... | ... | ... | ... | ... |

GENETIC PROCESSING

| | | 1ST | 2ND | 3RD | ... | REQUEST PLT ORDER SCORE | FUEL CONSUMPTION PLT ORDER SCORE |
|---|---|---|---|---|---|---|---|
| CROSSOVER | PLT CONFIGURATION PROPOSAL 1 | VEHICLE A → VEHICLE C | VEHICLE B → VEHICLE A | VEHICLE C → VEHICLE D | ... | 70 | 60 |
| CROSSOVER | PLT CONFIGURATION PROPOSAL 2 | VEHICLE C → VEHICLE A | VEHICLE A → VEHICLE B | — | ... | 0 | 90 |
| MUTATION → | PLT CONFIGURATION PROPOSAL 3 | VEHICLE G | VEHICLE A | VEHICLE F → VEHICLE E | ... | 40 | 60 |
| COPY → | PLT CONFIGURATION PROPOSAL 4 | VEHICLE C | VEHICLE D | — | ... | 50 | 20 |
| | ... | ... | ... | ... | ... | ... | ... |

FIG. 16

| REQUEST | PERSON A |
|---|---|
| DEPARTURE POINT | NAGOYA |
| ARRIVAL POINT | TOKYO |
| DEPARTURE TIME ZONE | AM |
| PLT ORDER | 1ST |
| DEPARTURE TIME | 9:00 |
| STOPOVER SA | SHIZUOKA |
| ROUTE | TOMEI |

| VEHICLE INFO | PERSON A |
|---|---|
| VEHICLE TYPE | SUV |
| MANNED/UNMANNED | MANNED |
| SAFETY FUNCTION | INSTALLED |

FURTHER VALUE INFO

| VALUE INFO (EACH-TIME-PAYMENT EXAMPLE) | |
|---|---|
| FEE | EACH-TIME-PAYMENT<br>(300 YEN PER ONE INDEX · FACTOR)<br>300 YEN × 5 ITEMS =1500 YEN |
| MAXIMIZED (IMPORTANT ) INDEX | REQUEST AND FUEL CONSUMPTION |
| INDEX FACTOR WEIGHT | FUEL-RELATED FACTOR<br>(VEHICLE TYPE · ROUTE · PLT ORDER)=2 |
| NON-NEGOTIABLE CONDITION | PLT ORDER, DEPARTURE TIME, STOPOVER SA, ROUTE |

| VALUE INFO (FLAT-RATE-PAYMENT EXAMPLE) | |
|---|---|
| FEE | FLAT-RATE-PAYMENT<br>5000 YEN PER MONTH FOR AS-MACH-AS-YOU-WANT-PLAN |
| MAXIMIZED (IMPORTANT ) INDEX | REQUEST AND FUEL CONSUMPTION |
| INDEX FACTOR WEIGHT | FUEL-RELATED FACTOR<br>(VEHICLE TYPE · ROUTE · PLT ORDER)=2 |
| NON-NEGOTIABLE CONDITION | PLT ORDER, DEPARTURE TIME, STOPOVER SA, ROUTE |

| VALUE INFO (AUCTION-PAYMENT EXAMPLE) | |
|---|---|
| FEE | AUCTION-PAYMENT<br>BIT 5000 YEN FOR FOLLOWING CONTENTS<br>(SUCCESSFUL BID) |
| MAXIMIZED (IMPORTANT ) INDEX | REQUEST AND FUEL CONSUMPTION |
| INDEX FACTOR WEIGHT | FUEL-RELATED FACTOR<br>(VEHICLE TYPE · ROUTE · PLT ORDER)=2 |
| NON-NEGOTIABLE CONDITION | PLT ORDER, DEPARTURE TIME, STOPOVER SA, ROUTE |

FIG. 17

| REQUEST | PERSON A |
| --- | --- |
| DEPARTURE POINT | NAGOYA |
| ARRIVAL POINT | TOKYO |
| DEPARTURE TIME ZONE | AM |
| PLT ORDER | 1ST |
| DEPARTURE TIME | 9:00 |
| STOPOVER SA | SHIZUOKA |
| ROUTE | TOMEI |

| VEHICLE INFO | PERSON A |
| --- | --- |
| VEHICLE TYPE | SUV |
| MANNED/UNMANNED | MANNED |
| SAFETY FUNCTION | INSTALLED |

FURTHER VALUE INFO

| VALUE INFO (EACH-TIME-PAYMENT EXAMPLE) | |
| --- | --- |
| FEE | EACH-TIME-PAYMENT<br>(300 YEN PER ONE INDEX · FACTOR)<br>300 YEN × 2 ITEMS =600 YEN |
| NON-NEGOTIABLE CONDITION | DEPARTURE TIME, ROUTE |

| VALUE INFO (FLAT-RATE-PAYMENT EXAMPLE) | |
| --- | --- |
| FEE | FLAT-RATE-PAYMENT<br>5000 YEN PER MONTH FOR<br>AS-MACH-AS-YOU-WANT-PLAN |
| NON-NEGOTIABLE CONDITION | DEPARTURE TIME, ROUTE |

| VALUE INFO (AUCTION-PAYMENT EXAMPLE) | |
| --- | --- |
| FEE | AUCTION-PAYMENT<br>BIT 5000 YEN FOR FOLLOWING CONTENTS<br>(SUCCESSFUL BID) |
| NON-NEGOTIABLE CONDITION | DEPARTURE TIME, ROUTE |

PLATOONING FORMATION PATTERN PROPOSAL METHOD, PLATOONING FORMATION PATTERN PROPOSAL DEVICE, AND PLATOONING FORMATION PATTERN PROPOSAL SYSTEM

CROSS REFERENCE TO RELATED APPLICATION

The present application claims the benefit of priority from Japanese Patent Application No. 2022-103582 filed on Jun. 28, 2022. The entire disclosure of the above application is incorporated herein by reference.

TECHNICAL FIELD

The present disclosure relates to a platooning formation pattern proposal method, a platooning formation pattern proposal device, and a platooning formation pattern proposal system for proposing a platooning formation pattern when platooning is performed by multiple vehicles.

BACKGROUND

According to platooning in which multiple vehicles form a platoon and travel, for example, it is possible to travel while maintaining a constant vehicle-to-vehicle distance between the multiple vehicles forming the platoon. Therefore, for example, it is possible to reduce the air resistance to the vehicle during traveling, and it is possible to expect an improvement in fuel consumption and safe traveling. Technologies for supporting such platooning are under development. In technology of a comparative example, vehicles are extracted based on reference information including at least one of destination information, departure location information, or current position information and forming the platoon using the extracted vehicles.

SUMMARY

By a platooning formation pattern proposal method, a platooning formation pattern proposal device, or a platooning formation pattern proposal system, a formation pattern of platooning is proposed when vehicles perform the platooning, information related to the formation pattern is collected, information in a predetermined index is extracted from the collected information, a score of the index is calculated, a recommendation formation pattern is proposed.

BRIEF DESCRIPTION OF DRAWINGS

FIG. 9 is a diagram schematically showing a calculation example of a factor score of a request index according to the present embodiment.

FIG. 10 is a diagram schematically showing a calculation example of a factor score of a fuel consumption index according to the present embodiment.

FIG. 11 is a diagram schematically showing examples of indices and factors according to the present embodiment.

FIG. 12 is a diagram schematically showing a setting example of a traveling speed factor score according to the present embodiment.

FIG. 13 is a diagram schematically showing a setting example of factor scores for the degree of labor cost reduction according to the present embodiment.

FIG. 14 is a diagram schematically showing a setting example of factor scores for safe driving contribution according to the present embodiment.

FIG. 15 is a diagram schematically showing an example of a solution process by a genetic algorithm according to the present embodiment.

FIG. 16 is a diagram (part 1) schematically showing one example of a value management process according to the present embodiment.

FIG. 17 is a diagram (part 2) schematically showing one example of a value management process according to the present embodiment.

DETAILED DESCRIPTION

Figure 1:
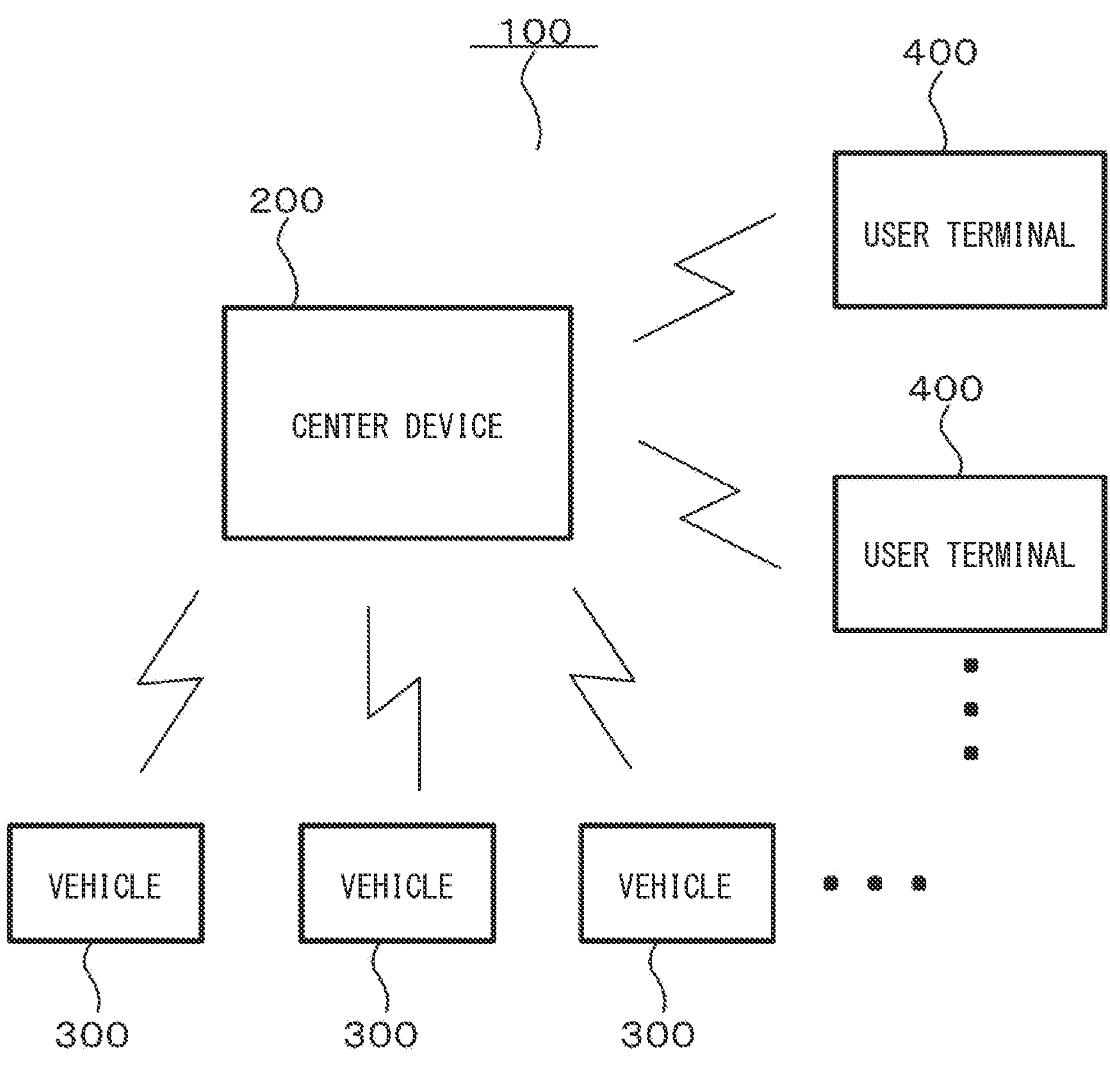
FIG. 1 is a block diagram schematically showing a configuration example of a platooning formation pattern proposal system according to the present embodiment.

By the way, when a rank of the platoon is formed, for example, it is possible to form the platoon in priority to improvement of a fuel efficiency. Alternatively, it is possible to form the platoon with priority given to request conditions of the vehicles participating in the platoon. That is, it is possible to form the platoon based on various indices according to the purpose of platooning. However, conventionally, this type of platooning is generally carried out only by multiple vehicles, for example, belonging to a single operator, or only by same type vehicles, such as trucks. That is, conventionally, the platooning is generally performed on the assumption of only specific vehicles such as commercial vehicles, for example. Therefore, the platoon formation is performed with priority given only to one index for commercial purposes, for example. Further, since the participating vehicles in the platoon are limited, no particular difficulty arises even when the platoon is formed with priority given to only one index.

On the other hand, the platooning of this type is expected to be used not only for commercial vehicles but also for general vehicles such as passenger cars, for example, in the future. In other words, it is expected that the number of cases in which a wide variety of vehicles participate in platooning will increase in the future. In the case where the wide variety of vehicles participate in the platooning, when the platoon is formed with priority given to only one index, it will be difficult to form a platoon that meets the requests of many participating vehicles. Therefore, there is concern that the incentive to participate in platooning will be lost, and the usability of platooning will decrease.

Therefore, one example of the present disclosure provides a platooning formation pattern proposal method, a platooning formation pattern proposal device, and a platooning formation pattern proposal system capable of avoiding losing the incentive to participate in platooning and improving the usability even when a wide variety of vehicles participate in the platooning.

According to one example embodiment, a platooning formation pattern proposal method proposes a formation pattern of platooning when multiple vehicles perform the platooning. The method includes: collecting information related to the formation pattern; extracting, as an index factor, information in a predetermined index from the collected information, wherein the predetermined index includes at least two indices; calculating a score of the index as an index score based on the extracted index factor; and proposing, as a recommendation formation pattern, the formation pattern for which the index score has been calculated, when the calculated index score satisfies a predetermined condition; when calculating the score, calculating the index score of at least two indices; and when the at least two index scores satisfy the predetermined condition, proposing, as the recommendation formation pattern, the formation pattern for which the index score has been calculated.

According to another example embodiment, a platooning formation pattern proposal device proposes a formation pattern of platooning when multiple vehicles perform the platooning. The device includes: an information collection unit configured to collect information related to the formation pattern; an index score calculation unit configured to extract, as an index factor, information in a predetermined index from the information collected by the information collection unit, and calculate a score of the index as an index score based on the extracted index factor; and a formation pattern proposal unit configured to propose, as a recommendation formation pattern, the formation pattern of which index score has been calculated, when the index score calculated by the index score calculation unit satisfies a predetermined condition. The index score calculation unit is further configured to calculate the index score of at least two indices. The formation pattern proposal unit is further configured to propose, as the recommendation formation pattern, the formation pattern for which the index score has been calculated, when the at least two index scores satisfy the predetermined condition.

Further, according to another example embodiment, a platooning formation pattern proposal system proposes a formation pattern of platooning when multiple vehicles perform the platooning. The system includes: an information collection unit configured to collect information related to the formation pattern; an index score calculation unit configured to extract, as an index factor, information in a predetermined index from the information collected by the information collection unit, and calculate a score of the index as an index score based on the extracted index factor; and a formation pattern proposal unit configured to propose, as a recommendation formation pattern, the formation pattern of which index score has been calculated, when the index score calculated by the index score calculation unit satisfies a predetermined condition. The index score calculation unit is further configured to calculate the index score of at least two indices. The formation pattern proposal unit is further configured to propose, as the recommendation formation pattern, the formation pattern for which the index score has been calculated, when the at least two index scores satisfy the predetermined condition.

According to the present disclosure, even when a wide variety of vehicles participate in the platooning, it is possible to avoid losing the incentive to participate in the platooning, and improve the usability of platooning.

Hereinafter, one embodiment of a platooning formation pattern proposal method, a platooning formation pattern proposal device, and a platooning formation pattern proposal system according to the present disclosure will be described will reference to the drawings. The platooning formation pattern proposal method, the platooning formation pattern proposal device, and the platooning formation pattern proposal system according to the present disclosure can propose a platooning formation pattern when multiple vehicles perform platooning.

A platooning formation pattern proposal system 100 illustrated in FIG. 1 is a system configuration mainly including a center device 200. The center device 200 is one example of the platooning formation pattern proposal device, and the center device 200, multiple vehicles 300, and multiple user terminals 400 construct the proposal system 100.

Figure 2:
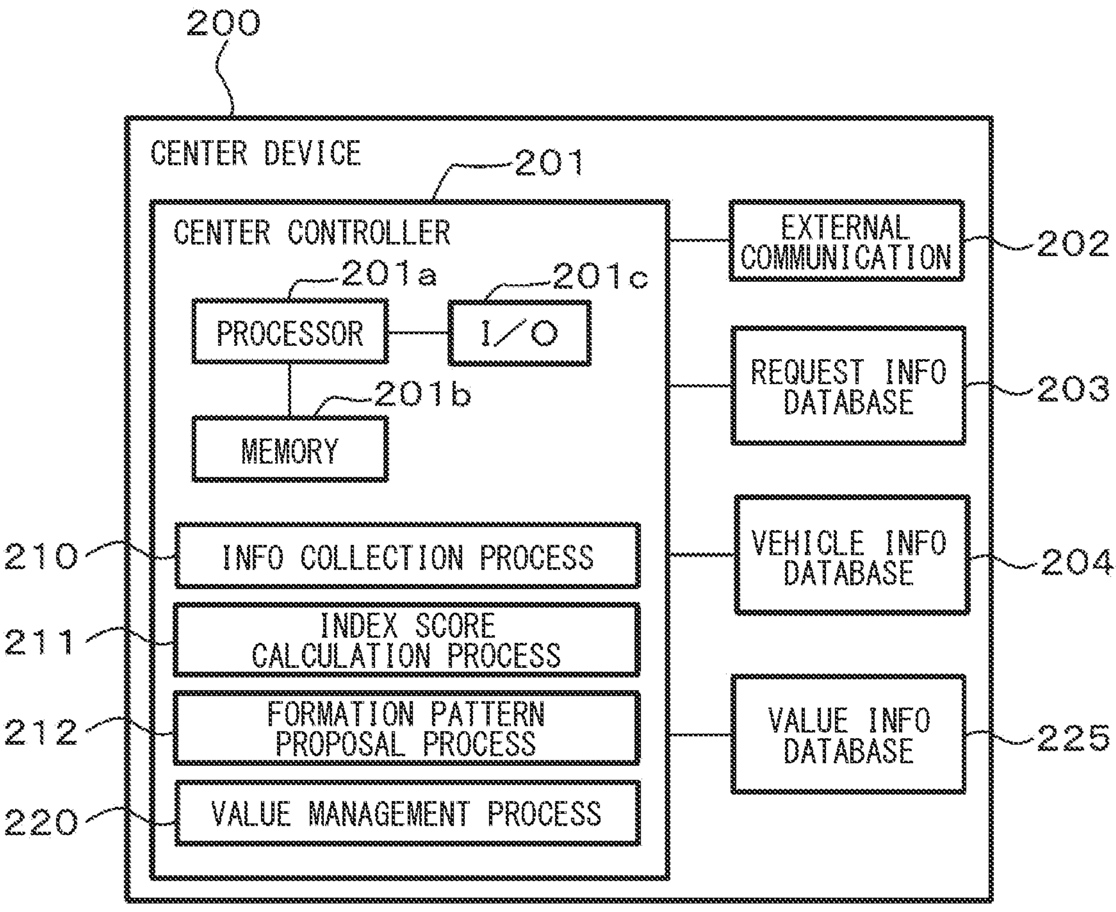
FIG. 2 is a block diagram schematically showing a configuration example of a center device according to the present embodiment.

Next, a configuration example of the center device 200 will be described in detail. As illustrated in FIG. 2, the center device 200 includes a center controller 201, an external communication unit 202, a request information database 203, a vehicle information database 204, and the like. In the drawings, the term of "information" may be also referred to as "INFO".

The center controller 201 includes a processor 201*a* configured by, for example, CPU (Central Processing Unit), a memory 201*b* that can store various data, and an input-output unit 201*c* that can receive and output various data, and the like, and can control the overall operation of the center device 200. The input-output unit 201*c* is called, for example, "I/O (Input/Output)", and the like.

Further, the center controller 201 virtually implement an information collection process unit 210, an index score calculation process unit 211, and a formation pattern proposal process unit 212 by, for example, causing the processor 201*a* to execute an application program. The information collection process unit 210, the index score calculation process unit 211, and the formation pattern proposal process unit 212 may be configured by hardware, or may be configured by a combination of software and hardware.

The information collection process unit 210 is an example of an information collection unit, and can execute an information collection process. The information collection process is a process for collecting information related to a formation pattern of the platooning by multiple vehicles 300. The information collection process unit 210 can collect various information necessary for constructing the platooning formation pattern, particularly, user request information from the user terminal 400 used by participants or people intending to participate in the platooning. The people intending to participate in the platooning may be also referred to as intending participants. Further, the information collection process unit 210 can collect various kinds of information necessary for constructing the formation pattern for the platooning, particularly, vehicle information of the vehicles 300, from the vehicles 300 participating in the platooning or the vehicles 300 that intend to participate.

The index score calculation process unit 211 is one example of an index score calculation process unit, and can execute an index score calculation process. The index score calculation process is a process that extracts, as an index factor, information in a predetermined index from the information collected in the information collection process, and calculates a score of the index as an index score based on the extracted index factor.

The formation pattern proposal process unit 212 is one example of a formation pattern proposal unit, and can execute a formation pattern proposal process. The formation pattern proposal process is a process for proposing, as a recommendation formation pattern, a formation pattern or which index score has been calculated, when the index score calculated by the index score calculation process satisfies the predetermined condition. In the present embodiment, the index score calculation process unit 211 can calculate the index scores of at least two indices. Then, when at least two index scores calculated by the index score calculation process unit 211 satisfy a predetermined condition, the formation pattern proposal process unit 212 can propose, as the recommendation formation pattern, the formation pattern for which the index score has been calculated The external communication unit 202 is configured by, for example, a wireless communication module. The center controller 201 can be connected via the external communication unit 202 so as to be capable of wireless communication with multiple vehicles 300 positioned outside or user terminals 400.

The request information database 203 is a database capable of storing various request information collected from the user terminals 400 used by the participants in the platoon or the people intending to participate, for example, in the information collection process described above.

The vehicle information database 204 is a database that can store various kinds of vehicle information related to the vehicle 300, the information being collected from the vehicle 300 participating in the platooning or the vehicle 300 intending to participate by the information collection process described above, for example.

Figure 3:
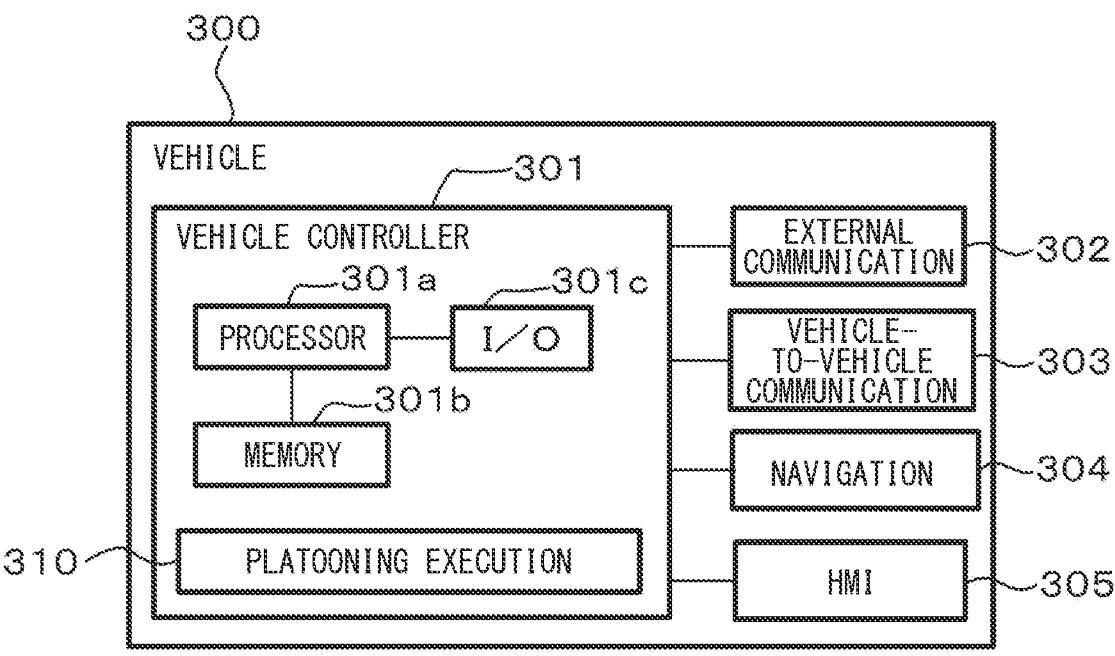
FIG. 3 is a block diagram schematically showing a configuration example of a vehicle according to the present embodiment.

Next, a configuration example of the vehicle 300 will be described in detail. As illustrated in FIG. 3, the vehicle 300 can be a participating vehicle participating in the platooning or a participation request vehicle with a request to participate. The vehicle 300 includes a vehicle controller 301, an external communication unit 302, a vehicle-to-vehicle communication unit 303, a navigation unit 304, a human machine interface 305, and the like.

The vehicle controller 301 includes a processor 301*a* configured by, for example, CPU (Central Processing Unit), a memory 301*b* that can store various data, and an input-output unit 301*c* that can receive and output various data, and the like, and can control the overall operation of the vehicle 300. The input-output unit 301*c* is called, for example, "I/O (Input/Output)", and the like.

The external communication unit 302 is configured by, for example, a wireless communication module. The vehicle controller 301 can be wirelessly communicatively connected to the center device 200 positioned outside via the external communication unit 302.

The vehicle-to-vehicle communication unit 303 is configured by, for example, a wireless communication module. The vehicle controller 301 can be connected so as to wirelessly communicate with other vehicles 300 via the vehicle-to-vehicle communication unit 303.

The navigation unit 304 identifies the current position of the vehicle 300 based on the positioning signal received from, for example, positioning satellites, and guides traveling of the vehicle 300 based on the identified position information, the map information, or the like.

The human machine interface 305 is a function unit responsible for communications between an occupant such as, for example, a driver of the vehicle 300 and the vehicle 300, and also referred to as HMI. The human machine interface 305 includes various functional units such as, for example, a steering wheel, pedals, operation switches, meters, display screen, and speaker.

Further, the vehicle controller 301 virtually implements a platooning execution unit 310 by software, for example, by executing an application program using the processor 301*a*. The platooning execution unit 310 may be configured by hardware or a combination of software and hardware.

The platooning execution unit 310 can execute the platooning of the multiple vehicles 300 based on a recommendation formation pattern provided from the center device 200 or a determined formation pattern, as described later. That is, the platooning execution unit 310 can control various operations such as traveling of the vehicle 300, for example, acceleration, deceleration, left turn, and right turn so that the vehicle 300 travels according to the recommendation formation pattern provided from the center device 200 or the determined formation pattern.

The vehicle controller 301 mounted on the vehicle 300 controls the traveling of each vehicle 300 according to the recommendation formation pattern or the determined formation pattern, so that it is possible to implement the platooning of multiple vehicles 300 based on the recommendation formation pattern or the determined formation pattern.

Figure 4:
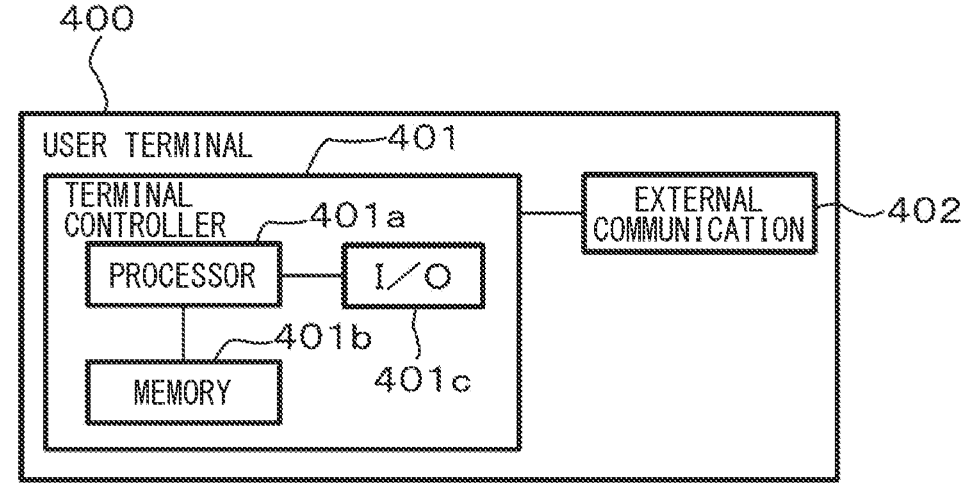
FIG. 4 is a block diagram schematically showing a configuration example of a user terminal according to the present embodiment.

Next, a configuration example of the user terminal 400 will be described in detail. The user terminal 400 includes various information communication terminals that can be used by users, such as smart phones, tablets, mobile phones, and notebook computers, for example. As illustrated in FIG. 4, the user terminal 400 includes a terminal controller 401 and an external communication unit 402. The user terminal 400 may be an in-vehicle device mounted on the vehicle 300, for example.

The terminal controller 401 includes a processor 401*a* configured by, for example, CPU (Central Processing Unit), a memory 401*b* that can store various data, and an input-output unit 401*c* that can receive and output various data, and the like, and can control the overall operation of the user terminal 400. The input-output unit 401*c* is called, for example, "I/O (Input/Output)", and the like. The external communication unit 402 is configured by, for example, a wireless communication module. The user terminal 400 can be wirelessly communicatively connected to the center device 200 positioned outside via the external communication unit 402. Thereby, the user participating in the platooning or the user intending to participate in the platooning uses the user terminal 400, and thereby can input the requirement information to the center device 200

Figure 5:
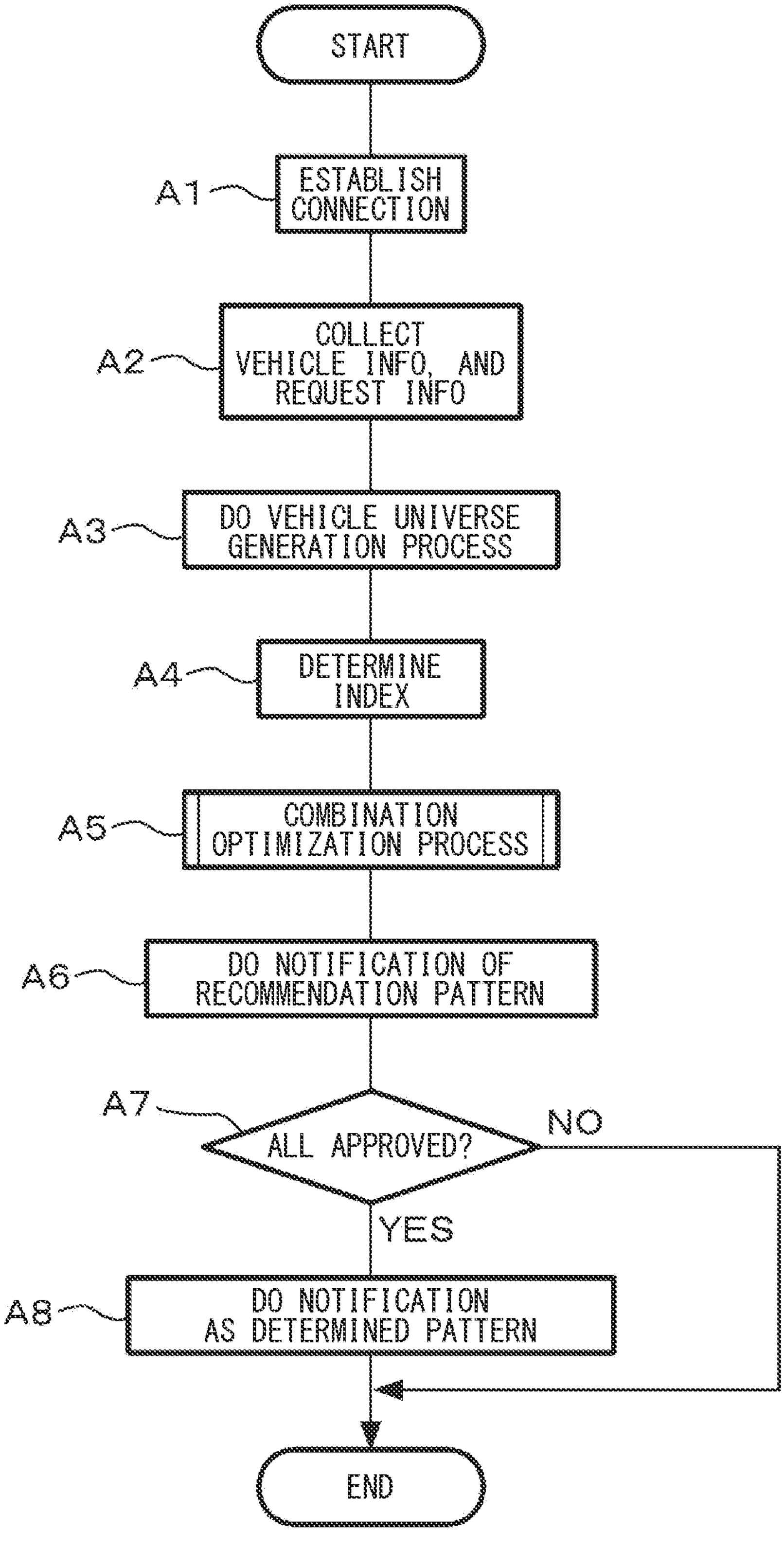
FIG. 5 is a flowchart schematically showing one example of a platooning formation pattern proposal process according to the present embodiment.

Next, one example of a platooning formation pattern proposal process executed by the center device 200 through the center controller 201 will be described in detail. As illustrated in FIG. 5, the center device 200 establishes a connection via wireless communication with the vehicle 300 and the user terminal 400 (in a process A1). Then, the center device 200 collects vehicle information from the vehicle 300 and collects request information from the user terminal 400 (in a process A2). The process A2 is one example of the information collection process for collecting information related to the formation pattern.

Then, the center device 200 executes a vehicle universe generation process (in a process A3). This vehicle universe generation process is an example of an information classification process, and is a process of classifying the various types of information collected in the process A2 into a target information group and a non-target information group. The target information group is an information group including various types of information related to users and vehicles 300 which may form the platoon. On the other hand, the non-target information group is an information group including various types of information related to users and vehicles 300 which may not form the platoon. For example, when destinations are different or departure dates are different, the users and the vehicles 300 are assumed to have no possibility of forming the platoon.

Then, the center device 200 generates a vehicle universe, that is, a group consisting of multiple vehicles 300 that may form the platoon based on various types of information classified into the target information groups that may form the platoon. Such an information classification process can be defined as a stratification process that stratifies collected information in terms of, for example, departure position, destination, departure time period, and the like.

Then, the center device 200 determines at least two indices that are considered most important when generating the platooning formation pattern, that is, at least two indices that maximize the degree of importance (in a process A4). In this case, the center device 200 determines at least two indices as the indices that maximize the degree of importance, in other words, the most important indices.

Then, the center device 200 executes a combination optimization process (in a process A5). This combination optimization process is a process of calculating an optimal formation pattern as a semi-optimal solution or an optimal solution when the platooning is performed by multiple vehicles 300. The contents of this combination optimization process will be described later.

In the combination optimization process, the optimal solution instead of the semi-optimal solution for the formation pattern may be calculated. The optimal solution is a solution that provides the most suitable formation pattern for the multiple vehicles 300 participating in platooning, that is, means that there is no formation pattern more suitable than the calculated optimal solution. On the other hand, the semi-optimal solution is a solution that approximates the optimal solution, that is, means that there may be a formation pattern more suitable than the calculated semi-optimal solution.

Then, the center device 200 provides notification of, or proposes, the formation pattern obtained by the combination optimization process as the final recommendation formation pattern (in a process A6). Then, the destination of notification of the recommendation formation pattern, that is, the proposal destination, may be the vehicle 300, the user terminal 400, or both the vehicle 300 and the user terminal 400. This process A6 is one example of the formation pattern proposal process.

When the recommendation formation pattern is reported to the vehicle 300, the recommendation formation pattern is displayed on a display screen (not shown) provided in the navigation unit 304, for example. Further, when the recommendation formation pattern is reported to the user terminal 400, the recommendation formation pattern is displayed on a display screen (not shown) of the user terminal 400, for example.

A user who participates in or intends to participate in the platooning confirms the recommendation formation pattern displayed by the vehicle 300 or the user terminal 400, that is, the contents of the recommendation formation pattern proposed by the center device 200. Then, when the user approves the contents of the proposed recommendation formation pattern, the user operates an approval button (not shown). Such an approval button is provided as a touch button on the display screen of the navigation unit 304 or the display screen of the user terminal 400, for example. The approval button may be, for example, a mechanical switch provided in the navigation unit 304.

When the approval button is operated in the vehicle 300, the vehicle controller 301 transmits approval information indicating that the recommendation formation pattern has been approved to the center device 200. The vehicle 300 stores information that can identify the user of the vehicle 300, for example, ID information. When transmitting the approval information to the center device 200, the vehicle controller 301 attaches information can identify the approved user to the approval information. Thereby, the center device 200 can identify which user approved the recommended formation pattern.

When the approval button is operated on the user terminal 400, the terminal controller 401 transmits approval information indicating that the recommendation formation pattern has been approved to the center device 200. The user terminal 400 stores information that can identify the user of the user terminal 400, for example, ID information. When transmitting the approval information to the center device 200, the terminal controller 401 attaches information that can identify the approved user to the approval information. Thereby, the center device 200 can identify which user approved the recommended formation pattern.

When all the users participating in the platooning or the people who intend to participate in the platooning operate the approval button, that is, all the participants or all the intending participants have approved the proposed recommended formation pattern (YES in a process A7), the center device 200 provides the notification of the approved recommendation formation pattern as the determined formation pattern (in a process A8) and ends the platooning formation pattern proposal process. The notification destination of the determined formation pattern may be the vehicle 300, the user terminal 400, or both the vehicle 300 and the user terminal 400.

Further, when some of users participating in the platooning or some of users intending to participate in the platooning have not operated the approval button or when all the people have not operated the approval button, that is, when the proposed recommendation formation pattern has not been approved by some of the participants in the platooning, some of the intending participants, all the participants, or all the intending participants (NO in a process A7), the center device 200 ends the platooning formation pattern proposal process without notification of the determined formation pattern (the process A8). Even when the user operation on the approval button is not performed for a predetermined time, the process may proceed on the assumption that the approval button has not been operated.

When the proposed recommendation formation pattern is not approved by some of the participants in the platooning, some of the intending participants, all the participants, or all the intending participants (NO in the process A7), for example, the process may return to the combination optimization process (process A5) described above, and the center device 200 may propose a different recommendation formation pattern.

A refusal button may be provided to positively indicate that the proposed recommendation formation pattern is not approved. In this case, when at least one of the users who participate in the platooning operates the refusal button, the center device 200 may determine that the proposed recommended formation pattern has not been approved. Similarly to the approval button, such a refusal button can be provided as a touch button on the display screen of the navigation unit 304 or the display screen of the user terminal 400, for example. The refusal button may be, for example, a mechanical switch provided in the navigation unit 304.

Further, after the platooning is started by the multiple vehicles 300 based on the determined formation pattern, the center device 200 may transmit change information for changing the platooning schedule according to the determined formation pattern to the vehicles 300 or the user terminal 400 at any time. That is, it is also possible to appropriately change the platooning plan based on the determined formation pattern after the platooning is started by the multiple vehicles 300.

Figure 6:
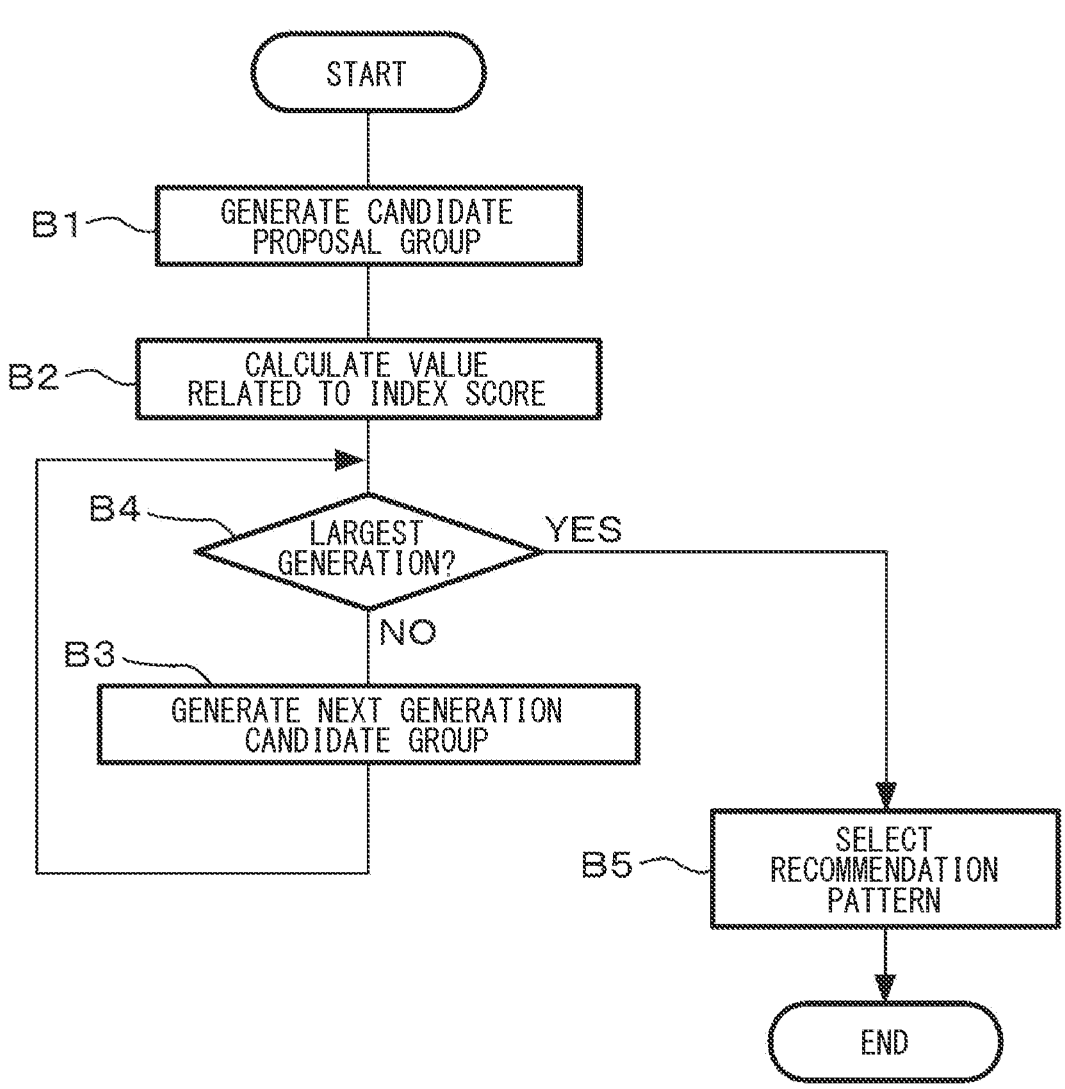
FIG. 6 is a flowchart schematically showing one example of an optimization process according to the present embodiment.

Next, an example of the combination optimization process (in the process A5) described above will be described in detail. FIG. 6 illustrates a process using a genetic algorithm as one example of the combination optimization process. As the combination optimization process, other methods such as dynamic programming, annealing, and Hopfield neural networks can be used. As illustrated in FIG. 6, the center device 200 creates multiple candidates of the formation pattern that are assumed when multiple vehicles 300 in the vehicle universe generated in the process A3 described above perform the platooning. The center device 200 generates a candidate group based on these multiple platoon configuration proposals (in a process B1). Hereinafter, the formation pattern candidate proposal may be also referred to as a "platoon configuration proposal". The semi-optimal solution is obtained by the combination optimization process.

Then, the center device 200 sets a candidate proposal group consisting of multiple platoon configuration proposals as a G generation, and calculates a value related to an index score for the G generation (in a process B2). The process B2 is one example of the index score calculation process that extracts, as an index factor, information in a predetermined index from the information collected in the information collection process, and calculates a score of the index as an index score based on the extracted index factor. The initial value of the generation number of "G" is normally "1". Also, the maximum value of the generation number of "G" can be changed and set as appropriate.

In the calculation process in the process B2, the center device 200 calculates the following four values as the values related to the index scores for the indices determined in the process A4, for example, when the number of indices determined in the process A4 is two.

Sum of an index score Sa and an index score Sb for the entire candidate proposal group.

Difference between the index score Sa and the index score Sb for the entire candidate proposal group.

Sum of the index score Sa and the index score Sb in each platoon configuration proposal.

Difference between the index score Sa and the index score Sb in each platoon configuration proposal.

Even when the number of indices determined in the process A4 is three or more, the sum and difference of the index scores for the entire candidate proposal group and the sum and difference of the index scores for each platoon configuration proposal are calculated. More specifically, the following four values are calculated. The following "N" is an integer equal to or greater than 3.

Sum of the first index score, the second index score, the third index score, . . . , the N-th index score in the entire candidate proposal group.

Difference of the first index score, the second index score, the third index score, . . . , the N-th index score in the entire candidate group.

Sum of the first index score, the second index score, the third index score, . . . , the N-th index score in each platoon configuration proposal.

Difference of the first index score, the second index score, the third index score, . . . , the N-th index score in each platoon configuration proposal.

Hereinafter, in the present embodiment, the case of maximizing two indices will be described, but three or more indices can be maximized according to the above method.

Then, the center device 200 generates a next-generation candidate proposal group by applying solution processing using a well-known genetic algorithm to the current-generation candidate proposal group (in a process B3), and calculates a value related to the index score for the next-generation (in the process B2). Then, when completing the calculation of the values related to the index scores for generations up to the G generation, which is the maximum generation (YES in a process B4), the center device 200 executes a recommended formation pattern selection process (in a process B5).

In the recommendation formation pattern selection process (process B5), the center device 200 selects, as the recommendation formation pattern, a formation pattern for which an index score satisfying all of the following conditions among the values obtained in the above-described processes B2 and B3 is calculated.

The sum of an index score Sa and an index score Sb for the entire candidate proposal group is the largest.

The difference between the index score Sa and the index score Sb in the entire candidate plan group is the smallest.

The sum of the index score Sa and the index score Sb in each platoon configuration proposal is the largest.

The difference between the index score Sa and the index score Sb in each platoon configuration proposal is the smallest.

When the recommendation formation pattern selection process (process B5) is completed, the center device 200 ends the combination optimization process and proceeds to a recommendation formation pattern notification process (process A6). That is, the center device 200 proposes the recommendation formation pattern selected by the combination optimization process (process A5) to the user.

Also, when the index score determined in the process A4 is three or more, the recommendation formation pattern is similarly selected and proposed. In this case, in the combination optimization process (process A5), when the sum of the three or more index scores determined in the process A4 is the largest and also the difference of the three or more index scores determined in step A4 is the smallest, the center device 200 may select, as the recommendation formation pattern, the formation pattern with the calculated index score and propose it.

Further, in the combination optimization process (process A5), when the sum of at least two index scores is the largest and also the difference of at least two index scores is the smallest, the center device 200 may acquire the formation pattern with the calculated index score as the semi-optimal solution or the optimal solution, and select and propose, as the recommendation formation pattern, the formation pattern with the acquired semi-optimal solution or the acquired optimal solution.

Figure 7:
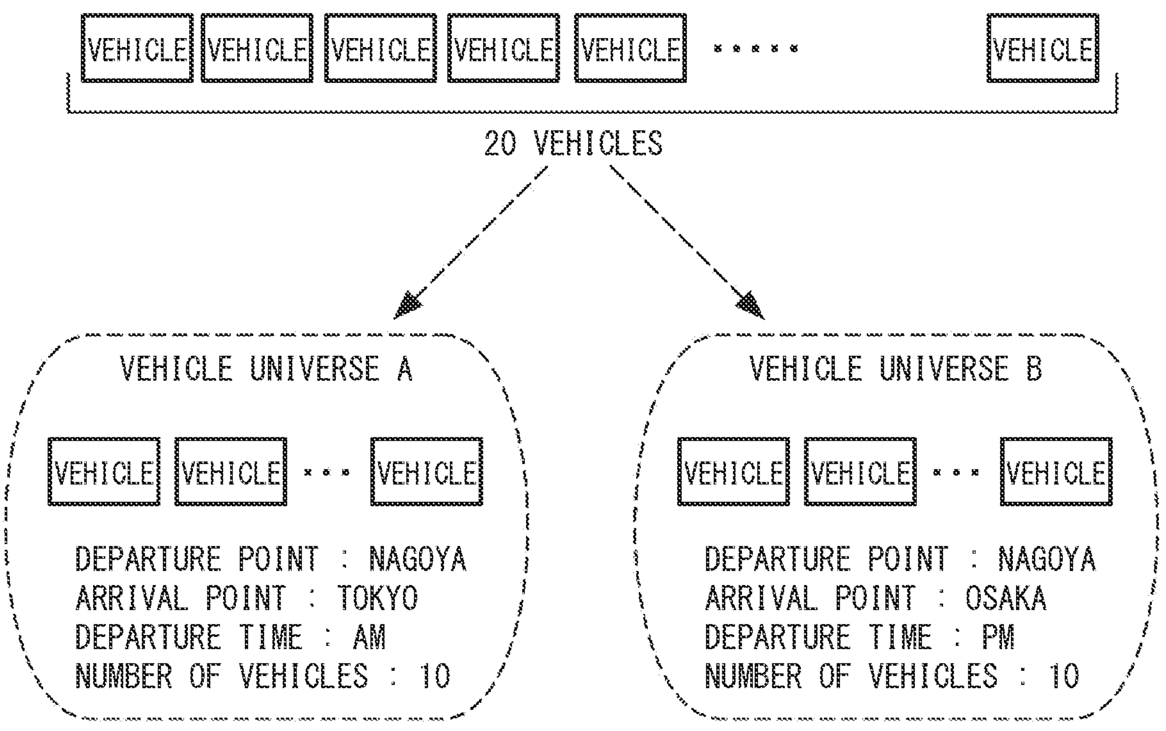
FIG. 7 is a diagram schematically showing an example of vehicle universe generation according to the present embodiment.

Next, regarding one example of the platooning formation pattern proposal process, a specific example of the content of the process will be described. As illustrated in FIG. 7, for example, it is assumed that there are twenty vehicles 300 that intend to participate in the platooning. In such a participation intending situation, the center device 200 generates a vehicle universe with a possibility of forming the platoon and a vehicle universe with no possibility of forming the platoon based on the information collected in the information collection process. Then, the center device 200 proposes the recommendation formation pattern for each generated vehicle universe.

Here, a case, where a platoon configuration proposal with both a predetermined index A and a predetermined index B, in other words, a platoon configuration proposal with emphasis on the predetermined index A and the predetermined index B in a group of ten vehicles 300 constituting the vehicle universe B, is proposed. In the participation intending information, a "departure point" of the vehicle universe B is Nagoya, and an "arrival point" is Osaka. Here, an example in which two indices are emphasized will be described, but three or more indices may be emphasized in constructing the platoon configuration proposal.

That is, the center device 200 generates a candidate proposal group consisting of multiple platoon configuration proposals for the vehicle universe B. Then, the center device 200 searches a platoon configuration in which the sum of the index score Sa and the index score Sb in the entire candidate proposal group is the largest and also the difference between the index score Sa and the index score Sb in the entire candidate proposal group is the smallest. That is, the center device 200 selects the platoon configuration proposal that maximizes the sum of the index score Sa and the index score Sb in the entire candidate proposal group and minimizes the difference, in order to use the two indices.

Figure 8:
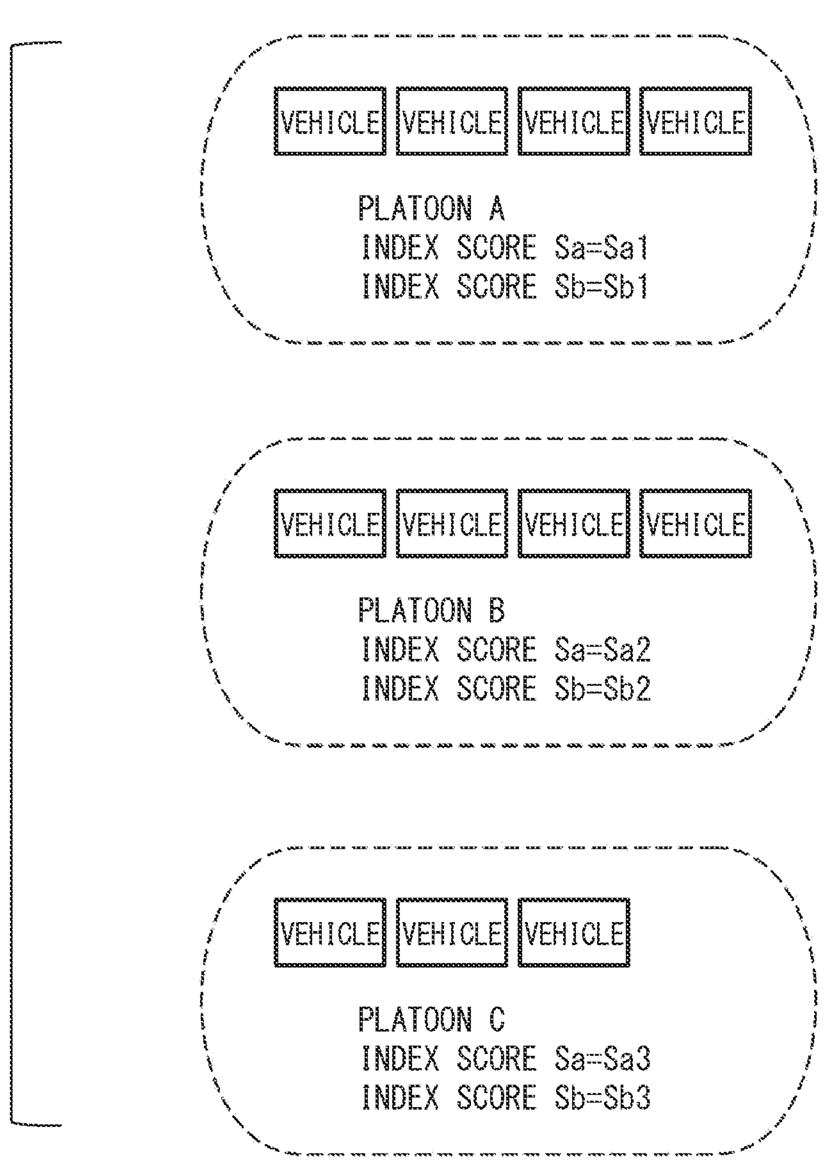
FIG. 8 is a diagram schematically showing one example of a platoon combination according to the present embodiment.

For example, in the combination of platoons A, B, and C illustrated in FIG. 8, the sum of index scores Sa in the entire candidate proposal group is "Sa1+Sa2+Sa3", and the sum of index scores Sb is "Sb1+Sb2+Sb3". Therefore, the center device 200 searches a platoon configuration proposal with the maximum value of "Sa1+Sa2+Sa3"+"Sb1+Sb2+Sb3" and the minimum value of "Sa1+Sa2+Sa3"−"Sb1+Sb2+Sb3". The number of platoons forming a candidate proposal group can be changed as appropriate, and the number of vehicles 300 forming each platoon can also be changed as appropriate.

In the following, for example, focusing on the platoon A, a case of calculating the index score of the platoon A will be described in detail.

That is, the center device 200 calculates the index score of the entire platoon by multiplying the index factor score by a predetermined weight w and obtaining the sum of the multiplied values. Therefore, an example of calculation using a request index and the fuel consumption index as indices will be described here. The request index is an index indicating that priority is given to request conditions of participants or intending participants in the platooning. Further, the fuel consumption index is an index indicating that priority is given to improving fuel consumption in the platooning.

In addition to the request index and the fuel consumption index, various indices such as, for example, a personnel cost index indicating that priority is given to reducing the personnel cost required for the platooning and a safety index indicating that priority is given to the safety during the platooning can be set. In addition, the weight w can be defined as a value that indicates the degree to which the index factor was considered important when calculating the current platoon configuration proposal and platoon traveling schedule, that is, a value in which the degree of importance is reflected.

Hereinafter, the detailed example will be described. For example, the factors constituting the request index are a platoon order factor indicating the order in which vehicle 300 are arranged during the platooning, a departure time factor indicating a start time of the platooning, and a stopover SA factor indicating a stopover rest area where the vehicle visits or stops during the platooning, and a route factor indicating a route along which the vehicle travels during the platooning. Then, the platoon order factor is scored as platoon order "a1", the departure time factor is scored as departure time "a2", the stopover SA factor is scored as stopover SA "a3", and the route factor is scored as a route "a4".

Then, the following relations are obtained.

Platoon order "$a1$"×Weight "$w1$"=Request platoon order score

Departure time "$a2$"×Weight "$w2$"=Request departure time score

Stopover SA"a3"×Weight "$w3$"=Request SA score

Route "$a4$"×Weight "$w4$"=Request route score

Accordingly, the request index score can be calculated using a relation of request index score="request platoon order score"+"request departure time score"+"request SA score"+"request route score".

Further, for example, the factors constituting the fuel consumption index are the platoon order factor indicating the order in which the vehicles 300 are arranged during the platooning, the route factor indicating the route along which the vehicles 300 travels during the platooning, and a vehicle type factor indicating the vehicle type of the vehicle 300 that participates in the platoon. Then, the platoon order factor is scored as platoon order "b1", the route factor is scored as route "b2", and the vehicle type factor is scored as vehicle type "b3".

Then, the following relations are obtained.

Platoon order "$b1$"×Weight "$w5$"=Fuel consumption platoon order score

Route "$b2$"×Weight "$w6$"=Fuel consumption route score

Vehicle type "$b3$"×Weight "$w7$"=Fuel consumption vehicle type score

Accordingly, the required fuel consumption index score can be calculated using a relation of fuel consumption index score="fuel consumption platoon order score"+"fuel consumption route score"+"fuel consumption vehicle type score".

When the number of factors differs for each index, that is, for example, when the request index has four factors and the fuel consumption index has three factors, the respective index scores may be calculated using a weighted average.

Next, one example of a method of calculating the index score will be described assuming a more specific case.

That is, for example, as illustrated in FIG. 9, when calculating the score of the request index, the center device 200 converts each request information of the platoon order factor, departure time factor, stopover SA factor, and route factor into scores and obtains the factor scores. In the drawings, the terms of "platoon" and "platooning" may be also referred to as "PLT". Here, each information is scored by, for example, −1 point, 0 point, or 1 point, but the manner of scoring is not limited to this.

More specifically, for example, when the platoon order of the platoon order factors is "ABC", that is, the order of a vehicle A of a person A, a vehicle B of a person B, and a vehicle C of a person C from the top, the factor score can be obtained as follows.

Request from person A (first): first request=1 point

Request from person B (second): first request=1 point

Request from person C (third): second request=0 point

Factor score of platoon order of "ABC"="1 point"+"1 point"+"0 point"="2 points"

Factor scores are similarly calculated for other platoon orders.

Further, the factor score of the departure time "9:00" among the departure time factors is obtained as follows.

Request from person A (9:00): first request=1 point

Request from person B (9:00): third request=−1 point

Request from person C (9:00): first request=1 point

Factor score of departure time of "9:00"="1 point"+"−1 point"+"1 point"="1 point"

Factor scores are similarly calculated for other departure times.

Further, the factor score of a stopover SA "Shizuoka Prefecture" among the stopover SA factors can be obtained as follows.

Request from person A (Shizuoka Prefecture): first request=1 point

Request from person B (none): no request=0 point

Request from person C (Shizuoka Prefecture): third request=−1 point

Factor score of stopover SA of "Shizuoka Prefecture"="1 point"+"0 point"+"−1 point"="0 point"

Factor scores are similarly calculated for other stopover SAs. In FIG. 9, the stopover SA "Shizuoka Prefecture" indicates a rest area existing in Shizuoka Prefecture, similarly, a stopover SA "Aichi Prefecture" indicates a rest area existing in Aichi Prefecture, and a stopover SA "Kanagawa Prefecture" indicates a rest area existing in Kanagawa Prefecture.

Further, a factor score of a route "general road" among the route factors can be obtained as follows.

Request from person A (general road): third request=−1 point

Request from person B (none): no request=0 point

Request from person C (general road): second request=0 point

Factor score of route of "general road"="−1 point"+"0 point"+"0 point"="−1 point"

Factor scores are similarly calculated for other routes.

Then, the center device 200 further weights each factor score with weights w1, w2, w3, and w4, and calculates the sum of the weighted factor scores as the score of the request index.

For example, when the requested platoon order is the vehicle A, the vehicle B, and the vehicle C from the top, the requested departure time is 9:00, and the requested stopover SA is a rest area in Shizuoka Prefecture, and also the requested route is the Tomei Expressway, the score of the request index can be obtained as follows. Request index score=Platoon order factor score "2"×w1+Departure time factor score "1"×w2+Stopover SA factor score "0"×w3+ Route factor score "0"×w4=3 In this case, the weights w1, w2, w3, and w4 are all set to "1". However, the values of the weights w1, w2, w3, and w4 can be appropriately changed and set. Also, the weights w1, w2, w3, and w4 may have different values.

Further, as illustrated in FIG. 10, when calculating the score of the fuel consumption index, the center device 200 converts each vehicle information of the platoon order factor, the route factor, and the vehicle type factor into scores and obtains a factor score. In the drawings, the vehicle type combination may be also referred to as "VE TYPE COMB". Here, each information is scored using, for example, a known simulation technique. Various scoring methods can be applied to the scoring of each information, as long as the content of each information can be fully reflected or can be reflected to some extent.

Then, the center device 200 further weights each factor score with weights w5, w6, and w7, and calculates the sum of the weighted factor scores as the score of the fuel consumption index.

For example, when the request platoon order is vehicles A, B, and C from the top, the request route is the Tomei Expressway, and the multiple vehicles 300 participating in the platooning are a combination of the same vehicle type, the fuel consumption index score can be obtained as follows.

$$\text{Fuel consumption index score=platoon order factor score “1”}\times w5\text{+route factor score “1”}\times w6\text{+vehicle type factor score “1”}\times w7\text{=3}$$

In this case, the weights w5, w6, and w7 are all set to "1". However, the values of the weights w5, w6, and w7 can be appropriately changed and set. Also, the weights w5, w6, and w7 may have different values.

For example, as described above, the center device 200 calculates the score of the request index and the score of the fuel consumption index. Then, the center device 200 acquires, as a semi-optimal or optimal solution by a known combination optimization process, a pattern in which the sum of the request index score and the fuel consumption index score is the maximum and the difference between the request index score and the fuel consumption index score is the minimum. Then, the center device 200 selects, as a recommendation formation pattern, the formation pattern for which the semi-optimal solution or the optimal solution has been obtained, and proposes it to the participants of the platooning or the intending participants.

Further, by setting the values of the weights w1, w2, w3, and w4 for calculating the score of the request index to values higher than the weights w5, w6, and w7 for calculating the score of the fuel consumption index, it is possible to obtain the solution of the formation pattern in a state where the request index is more emphasized. On the other hand, by setting the weights w5, w6, and w7 for calculating the score of the fuel consumption index to values higher than the weights w1, w2, w3, and w4 for calculating the score of the request index, it is possible to obtain the solution of the formation pattern in a state where the fuel consumption index is more emphasized.

In addition, when performing such combinatorial optimization processing, the center device 200 utilizes the well-known genetic algorithm as described above, thereby preventing an increase in the amount of calculation. Thereby, for example, without using a computer with extremely high computing power such as a quantum computer, it is possible to perform the combinatorial optimization processing as described above without difficulty. The center device 200 can utilize other methods such as, for example, well-known dynamic programming, annealing, Hopfield neural network processing, and the like, instead of the genetic algorithm. A flow illustrated in FIG. 6 is a flow when the genetic algorithm is used as one example of the combinatorial optimization processing. When other methods such as dynamic programming, annealing, Hopfield neural network processing, and the like are used, the different flow is used.

FIG. 11 shows one example of indices that can be applied to the present embodiment and one example of factors that constitute each index. Needless to say, index examples and factor examples not illustrated in FIG. 11 are also applicable.

As exemplified in FIG. 11, factors such as, for example, platoon order, vehicle type, route, and the like can be applied to the fuel consumption index. As described above, factor scores can be calculated for each factor and assigned.

Further, in addition to the above-described factors, other factors such as, for example, platooning start time, platooning start distance, platooning distance, route, departure time, arrival time, driver burden, and travel speed can be applied to the request index.

Here, the platooning start time indicates the time at which the platooning starts, and is a factor in which how quickly the platooning can be started is reflected. Further, the platooning start distance indicates the distance from the current position to the point where the platooning starts, and is a factor in which how close the platooning can start is reflected. Further, the platooning distance is a factor indicating the total distance for platooning. Further, the route indicates the route for platooning, and is a factor in consideration of, for example, general roads, expressways, road tolls, waypoints, stopover rest areas and stopover parking areas, width of roads for platooning, scenery during the platooning, and the like. In the drawings, the general road may be referred to as "GN ROAD".

Further, the departure time is a factor indicating a specific time of departure from the platooning starting point. Further, the arrival time is a factor indicating the specific time of arrival at the arrival point of the platooning. Further, the driver burden indicates the burden imposed on the driver due to the platooning, and is a factor in which, for example, the order of platooning and the difference between manned traveling and unmanned traveling are reflected.

Further, as illustrated in FIG. 12, for example, the traveling speed is a factor that indicates whether all sections, in which platooning is performed, are in the same traveling speed zone or a part of the sections is in a different traveling speed zone. When all sections in which platooning is performed is in the same traveling speed zone, it is possible to reduce the fuel consumption due to the platooning and the burden imposed on the driver. Therefore, the factor score, when all sections in which the platooning is performed is in the same traveling speed zone is set to a high score, for example, "1 point". On the other hand, when a part of the sections in which the platooning is performed is in the different traveling speed zone, it becomes difficult to reduce the fuel consumption due to the platooning and the burden imposed on the driver. Therefore, the factor score is set to a low score, such as, for example, "−1 point", when a part of the sections in which the platooning is performed is in the different traveling speed zone.

In addition, as illustrated in FIG. 11, the personnel cost index can include, for example, whether the platoon participating vehicle is manned or unmanned, the degree of personnel cost reduction, or the like. The labor cost reduction degree is a factor that indicates whether all the vehicles 300 participating in the platoon are manned or include the unmanned vehicle 300, as illustrated in FIG. 13, for example. When the platooning includes the unmanned vehicle 300, the vehicle 300 does not require a driver. Therefore, it is possible to reduce the personnel cost. Therefore, the factor score when the platoon includes the unmanned vehicle 300 is a high score, for example, "1 point". On the other hand, when all the vehicles 300 participating in the platooning are manned, drivers are required for all the vehicles 300 participating in the platooning. Therefore, it is difficult to reduce the personnel cost. Therefore, when all the vehicles 300 participating in the platooning are manned, the factor score is a low score, for example, "−1 point".

Further, as illustrated in FIG. 11, the factor of the safety index can be set to, for example, a factor indicating whether a safety function is installed, the degree of contribution to safe driving, or the like. For example, as illustrated in FIG. 14, the degree of the safe driving contribution is an index indicating whether the vehicle 300 having a predetermined safety function participates in the platooning or all the vehicles 300 participating in the platooning do not have the predetermined safety function. When the vehicle 300 having the predetermined safety function participates in platooning, it is possible to increase the safety of platooning. Therefore, the factor score when the vehicle 300 having the predetermined safety function participates in the platooning is a high score, for example, "1 point". On the other hand, when all the vehicles 300 participating in platooning are vehicles 300 that do not have the predetermined safety function, it is difficult to increase the safety of platooning. Therefore, when all the vehicles 300 participating in the platooning are vehicles 300 that do not have the predetermined safety function, the factor score is a low score, for example, "−1 point".

As the predetermined safety function, for example, a so-called advanced driving assistance system function such as an ADAS function (Advanced Driving Assistant System) is assumed.

As described above, as the indices, it is possible to set various indices such as, at least the fuel consumption index indicating that priority is given to improving fuel efficiency, the request index indicating that priority is given to the request condition of the participant and the participating vehicle in the platooning, and the personnel cost index indicating that priority is given to reducing the personnel cost required for platooning and the safety index indicating that priority is given to the safety during the platooning. Further, various indices different from these can be set. In the index score calculation process, the center device 200 can calculate the index score of the combination of multiple indices by appropriately combining at least two of the fuel consumption index, the request index, the personnel cost index, the safety index, or various other indices.

Further, according to the solution processing by the well-known genetic algorithm as described above, for example, as illustrated in FIG. 15, genetic processing such as, for example, crossover processing, mutation processing, copy processing, or the like is performed on the current-generation platoon configuration proposal, and the result is stored as a next-generation platoon configuration proposal. A more optimal solution can be obtained by repeating such a solution process over multiple generations. Various parameters such as the crossover rate in the crossover processing and the mutation rate in the mutation processing can be changed and set as appropriate.

Further, as illustrated in FIG. 2, the center device 200 further includes a value management processing unit 220. The center controller 201 virtually implements the value management processing unit 220 by software, for example, by the processor 201*a* executing an application program.

The value management processing unit 220 may be configured by hardware or a combination of software and hardware.

The value management processing unit 220 is one example of a value management unit, and can grant a participant or an intending participant having provided a predetermined value for the platooning a predetermined right. The predetermined value may be, for example, money, which is a realistic value, or virtual currency, points, or the like, which are virtual values. The value management processing unit 220 can store the provided value in a value management database 225 and manage it.

Next, the functions of the value management processing unit 220 will be described in more detail. The value management processing unit 220 can grant the user who has provided a predetermined value, as a predetermined right, the right to select at least two indices used in the index score calculation process. Accordingly, the user can designate one or more indices that the user wants to give priority to by providing the predetermined value. The user who has provided the predetermined value can also be called a user who intends to provide a predetermined value until the formation pattern of platooning is fixed.

Furthermore, the value management processing unit 220 can grant the user who has provided the predetermined value, as a predetermined right, the right to select a weighting value for the selected index. Therefore, by providing the predetermined value, the user can increase the importance of one or more indices selected by the user.

Furthermore, the value management processing unit 220 can grant the user who has provided the predetermined value, as a predetermined right, the right to designate a non-negotiable condition in the platooning. Therefore, by providing a predetermined value, the user can set the condition that must be satisfied in the platooning.

For example, as illustrated in FIG. 16, the value management processing unit 220 selects, for a person who has provided the predetermined value, the recommendation formation pattern based on the provided value information in addition to the collected information and vehicle information. In the value information, the user who has provided the predetermined value can select the maximum important index, that is, the most important index, and select the weighting, that is, the importance for the selected index.

With reference to the flow illustrated in FIG. 5, for example, in a process A2, the center device 200 acquires value information from the user terminal 400 of the user who intends to provide a predetermined value in addition to collection of the vehicle information from the vehicle 300 and collection of the request information from the user terminal 400. In a process A4, the center device 200 sets the weight of the index or the index factor score selected by the user, who intends to provide the predetermined value, to an index and a weight used when generating the formation pattern of the platooning. In a process A7, when the recommendation formation pattern is approved by all the participants in the platooning or all the people who intend to participate, it is determined that the user who intends to provide the predetermined value will provide the predetermined value. Thereby, for example, charging to the user who intends to provide the predetermined value is determined.

An "each-time-payment" type is a type in which a predetermined value is paid each time. According to the "each-time-payment" type, the participant in the platoon or the intending participant can preferentially reflect its request in the platooning formation by paying a value each time.

The "flat-rate-payment" type is a type in which a predetermined value is paid at a flat rate. According to the "flat-rate-payment" type, the participant or the person who intends to participate in the platooning can preferentially reflect its request in the platooning formation during a predetermined period, for example, a month in which the participant or person paid the predetermined value, by paying the value at a flat rate.

Also, an "auction" type is a type in which a predetermined value is paid in an auction format. According to the "auction" type, the participant in the platooning or the intending participant can bid on the platooning formation proposal in which the own request is reflected, and it is possible to perform the platooning with the formation in which the own request is reflected, when the bid formation proposal is won.

Further, the value management processing unit 220 can grant a user who has provided the predetermined value, as the predetermined right, the right to reflect the own request condition in the recommendation formation pattern proposed by the formation pattern proposal process. In this case, the center device 200 determines the index that maximizes the importance in generating the platooning formation pattern or the weight of the index factor score. In the process A6 of FIG. 5, when providing the notification, that is, proposing the formation pattern acquired by the combination optimization processing as the final recommendation formation pattern, the center device 200 reflects the predetermined value in the request condition of the user intending to provide the predetermined value within a range where the formation pattern of the platoon including the user intending to provide the predetermined value is not changed or a range where the change is suppressed.

More specifically, for example, as illustrated in FIG. 17, the value management processing unit 220 selects, for the user who has provided the predetermined value, the recommendation formation pattern based on the provided value information in addition to the collected information and vehicle information. In the value information, the person who has provided the predetermined value can reflect the own request as the "non-negotiable condition".

Further, the value management processing unit 220 can grant the user who has provided a predetermined value, as the predetermined right, the right to include information, in which the own request condition reflected, in the information collected by the information collection process. For example, in the process A2 of FIG. 5, the center device 200 collects vehicle information from the vehicle 300, collects the request information from the user terminal 400, and collects the value information and ride-sharing request information.

Figure 18:
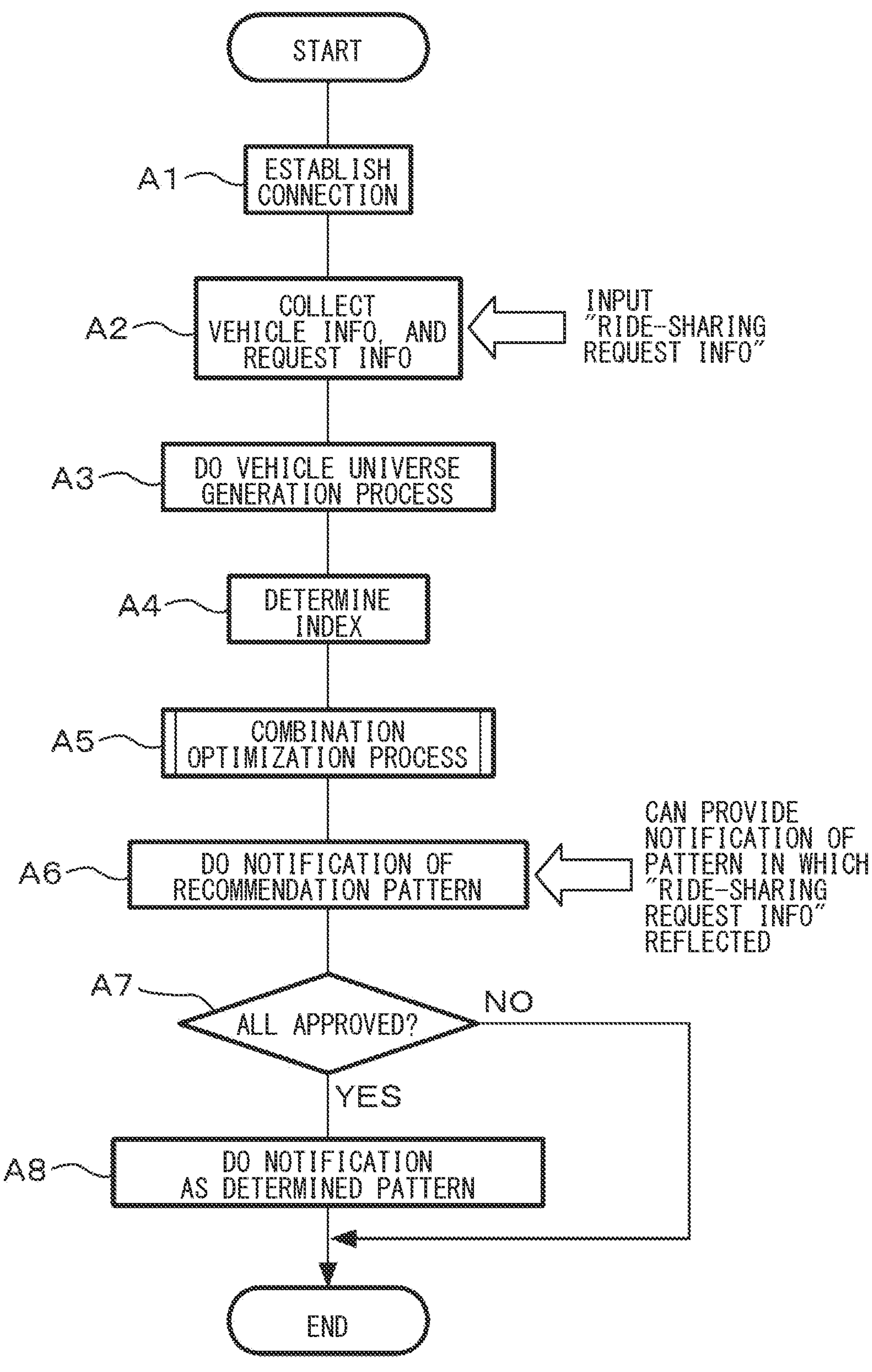
FIG. 18 is a flowchart schematically showing one example of a value management process according to the present embodiment.

More specifically, as illustrated in FIG. 18, the participant in the platoon or the intending participant can input the own request information as the "ride-sharing request information" via the user terminal 400, for example. The center device 200 collects this "ride-sharing request information" with the request information or vehicle information from the user terminal 400. Based on the collected value information or "ride-sharing request information" in addition to the collected request information or vehicle information, the center device 200 proposes the recommendation formation pattern to the user.

The user who has input the "ride-sharing request information" can approve the recommendation formation pattern when the own "ride-sharing request information" is sufficiently reflected in the proposed recommendation formation pattern. Further, the recommendation formation pattern is also proposed to a user other than the user who has input the "ride-sharing request information". Then, when the user other than the user who has input the "ride-sharing request information" thinks that it is acceptable to participate in the platooning according to the proposed recommendation formation pattern, the user can participate in the platooning according to the recommendation formation pattern by approving the recommendation formation pattern.

The "approval" as used herein means consent to pay a value such as a fee in order to participate in the platooning in which "ride-sharing request information" of another person is reflected. Even when the center device 200 does not obtain approval from all the users who have proposed the platoon configuration proposal in which the "ride-sharing request information" is reflected, the center device 200 notifies only the user who has obtained the approval of, as the determined formation pattern, the platoon configuration proposal in which the "ride-sharing request information" is reflected. Then, the center device 200 executes a predetermined billing process only for the users to whom the determined formation pattern has been notified, that is, only for the users who have been approved.

In this way, the user who has input the "ride-sharing request information" can solicit other users who are willing to participate in the platooning according to the recommendation formation pattern in which the own "ride-sharing request information" is reflected. That is, the user who has input "ride-sharing request information" can solicit other users who are willing to participate in the platooning, that is, "share a ride" during the platooning using the formation in which the own request is reflected.

The center device 200 may propose not only the platoon configuration proposal in which the "ride-sharing request information" is reflected, but also a platoon configuration proposal in which the "ride-sharing request information" is not reflected. According to this configuration example, for example, a user other than the user who has input the "ride-sharing request information" can approve the platoon configuration proposal in which the "ride-sharing request information" is not reflected. In this case, the center device 200 may propose only the platoon configuration proposal, in which the "ride-sharing request information" is reflected, to the user who has input the "ride-sharing request information".

Further, the center device 200 may collect information indicating whether there is a request for the "ride-sharing". Then, for example, when there are three participating vehicles or vehicles intending to participate in the platooning with the "ride-sharing" among ten vehicles, the center device 200 generates a platoon configuration proposal for three vehicles, and one or more different platoon configuration proposals for the remaining seven vehicles.

Further, in the above-described "ride-sharing" pattern, a solicitor can solicit participants by presenting a participation fee for platooning in which the highest priority is given to a request of the solicitor. Then, the intending participant intending to participant in the platooning with the "ride-sharing" can participate in the platooning by paying a predetermined value. As a specific "ride-sharing" pattern, for example, a case where it is required to form a platoon with only vehicles driven by "females" by paying a predetermined value can be considered.

As described above, the center device 200 provides preferential treatment by granting the participant or the intending participant, in the platooning for which the participants or the person has provided the predetermined value, a predetermined right. Then, it is preferable that the center device 200 proposes an optimal platoon formation so that the requests of the users who have provided the predetermined value do not conflict with each other. However, it is assumed that there may be cases where user requests conflict with each other. Therefore, when the user requests conflict with each other, the center device 200 may generate separate platoon formation proposals in which the respective requests are reflected and provide them to the respective users.

Further, as a method of providing the predetermined value, various payment formats can be applied, and for example, a payment format in which the each-time-payment and the flat-rate-payment coexist may be used.

Also, in the each-time-payment format, each time the user participates in the platooning or intends to participate, for example, the value set by the center device 200 is paid. For example, the value may be changed according to request contents such as the requested index and weight, or a system may be used in which a predetermined value is paid for a set of multiple indexes and multiple weights.

Also, in the flat-rate-payment format, for example, a value set by the center device 200 is paid for a predetermined period or every predetermined number of times. For example, an arbitrary number of indices or weights may be designated within a predetermined period, or indices and weights for an arbitrary number of platooning may be designated within a predetermined period. Alternatively, a plan with multiple stages may be provided as the flat-rate-payment plan. In this case, an upper limit may be set for the number of indices that can be designated, the number of weights that can be designated, and the number of times that can be designated. Further, as the flat-rate-payment plan, various plans such as, for example, a free membership plan, a basic membership plan, a premium membership plan, and the like can be set.

Further, in the auction payment format, the highest priority is given to the request of the user who paid the highest value. As for the auction payment format, for example, it is preferable to avoid coexistence with other payment methods such as the each-time-payment form and the flat-rate-payment form. In the auction payment format, for example, a predetermined amount of value is bid for request contents such as index and weight. Then, when the request content for which the highest value is bid and the bid is successful, the request is reflected in the platooning formation pattern proposal. The requests of other users, that is, users other than the user who has paid the highest value, are not taken into account, and no billing is incurred for those users.

Further, a user who does not pay the predetermined value can participate in the platooning according to the presented platoon configuration proposal by approving the presented platoon configuration proposal, when the presented platoon configuration proposal has contents in which the own request is reflected to some extent. The user who does not pay a predetermined value may not approve or may reject the presented platoon configuration proposal when the content does not sufficiently include the own request.

Further, the center device 200 may first generate a platoon configuration proposal based on the collected information, and reflect the requests of the user who has provided the predetermined value in the platoon configuration proposal.

According to the present embodiment illustrated above, when the calculated index score satisfies a predetermined condition, the center device 200 proposes the formation pattern for which the index score was calculated as the recommendation formation pattern, and calculates index scores of at least two indices. When at least two index scores satisfy a predetermined condition, the center device 200 proposes the formation pattern for which the index scores are calculated as the recommendation formation pattern.

According to this configuration example, it is possible to propose the formation pattern calculated based on at least two indices as the recommendation formation pattern, and make it easier to propose the formation pattern in which the request of the participant or the intending participant in the platooning is reflected. Thereby, even when a wide variety of vehicles participate in the platooning, it is possible to avoid losing the incentive to participate in the platooning, and improve the usability of platooning.

Further, according to the present embodiment, in the formation pattern proposal process, when the sum of at least two index scores is the maximum and also the difference between at least two index scores is the minimum, the center device 200 proposes the formation pattern for which the index score is calculated as the recommendation formation pattern. That is, in the present embodiment, the center device 200 proposes the formation pattern calculated based on at least two indices as the recommendation formation pattern. In this way, when the sum of at least two index scores is the maximum and also the difference between at least two index scores is the minimum, by proposing the formation pattern as the recommendation formation pattern, it is possible to propose more optimal formation pattern based on at least two indices.

Further, according to the present embodiment, in the formation pattern proposal process, when the sum of at least two index scores is the largest and also the difference of at least two index scores is the smallest, the center device 200 may acquire the formation pattern with the calculated index score as the semi-optimal solution or the optimal solution in the combination optimization process, and propose, as the recommendation formation pattern, the formation pattern with the acquired semi-optimal solution or the acquired optimal solution. By selecting the recommendation formation pattern using such an algorithm for searching for the optimal combination solution, it becomes possible to propose a more optimal formation pattern.

Further, according to the present embodiment, the center device 200 cam execute an information classification process of classifying the information collected in the information collection process into a target information group that may form a platoon and a non-target information group that may not form a platoon. Further, the center device 200 executes the information classification process between the information collection process and the index score calculation process. Then, in the index score calculation process, the center device 200 extracts, as the index factor, information in the predetermined index from the target information group, and calculates the score of the index as the index score based on the extracted index factor.

According to this configuration example, it is possible to calculate the index score after narrowing down the vehicle universe to the target information group with a possibility of forming the platoon. Thereby, it is possible to prevent unnecessary processing from being performed on a non-target information group that has no possibility of forming the platoon, and it is possible to calculate index scores more efficiently and more quickly.

Further, according to the present embodiment, the center device 200 can grant the participant or the intending participant who has provided the predetermined value the predetermined right. According to this configuration example, the participant or the intending participant in the platooning can reflect the own request in the formation pattern of the platooning by providing the predetermined value. Thereby, even when a wide variety of vehicles participate in platooning, it is possible to more avoid losing the incentive to participate in the platooning, and more improve the usability of platooning.

Further, according to the present embodiment, the center device 200 can grant the participant or the intending participant who has provided the predetermined value, as the predetermined right, a right for selecting at least two indices in the index score calculation process. According to this configuration example, the participant or the intending participant in the platooning can obtain the formation pattern calculated based on the index in which the own request is reflected.

Further, according to the present embodiment, the center device 200 can grant the participant or the intending participant who has provided the predetermined value, as the predetermined right, the right to reflect the own request condition in the recommendation formation pattern proposed by the formation pattern proposal process. According to this configuration example, the participant or the intending participant in the platooning can obtain the formation pattern calculated based on the index in which the own request is reflected.

Further, according to the present embodiment, the center device 200 can grant the participant or the intending participant who has provided the predetermined value, as the predetermined right, a right for causing information, in which the own request condition is reflected, to be included in information collected by the information collection process. According to this configuration example, the participant or the intending participant in the platooning can obtain the formation pattern calculated based on the information in which the own request is reflected.

The present embodiment is not limited to the above-described embodiment, and changes, modifications, and extensions can be appropriately made without departing from the gist thereof. For example, the platooning formation pattern proposal system 100 may communicate between the center device 200 and the vehicle 300 via another device. Other devices, for example, a vehicle allocation server installed at a vehicle allocation center can be assumed. Further, the platooning formation pattern proposal system 100 may have a system configuration constructed by communicably connecting multiple devices, or may have a system configuration constructed within a single device. The platooning formation pattern proposal system 100 may be configured by the vehicle controller 301 of the vehicle 300 without using the center device 200. Alternatively, the center device 200 may execute a part of the platooning formation pattern proposal process, and the vehicle controller 301 may execute the reaming part. Further, the vehicle controller 301 of the multiple vehicles 300 may share the proposal process of the platooning formation pattern.

Although the present disclosure has been described in accordance with the above embodiments, it is understood that the present disclosure is not limited to the above embodiments and configurations. The present disclosure incorporates various modifications and variations within a scope of equivalents. Furthermore, various combination and formations, and other combinations and formations including one, more than one or less than one element are also within the scope of the present disclosure.

The controller and the method according to the present disclosure may be achieved by a dedicated computer provided by constituting a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the controller and the method thereof described in the present disclosure may be implemented by one or more dedicated computers configured by a combination of a processor and a memory programmed to execute one or more functions and a processor configured by one or more hardware logic circuits. The computer program may be stored in a computer readable and non-transitory tangible storage medium as instructions to be executed by a computer.

In the drawings, the numeral reference of 100 indicates the platooning formation pattern proposal system, the numeral reference of 200 indicates the center device (platooning formation pattern proposal device), the numeral reference of 210 indicates the information collection processing unit (information collection unit), the numeral reference of 211 indicates the index score calculation processing unit (index score calculation unit), the numeral reference of 212 indicates the formation pattern proposal processing unit (formation pattern proposal unit), and the numeral reference of 300 indicates the vehicle.

Here, the process of the flowchart or the flowchart described in this application includes a plurality of sections (or steps), and each section is expressed as, for example, A1. Further, each section may be divided into several subsections, while several sections may be combined into one section. Furthermore, each section thus configured may be referred to as a device, module, or means.

The invention claimed is:

1. A platooning formation pattern proposal method for proposing a formation pattern of platooning when a plurality of vehicles perform the platooning, the method comprising:

collecting information related to the formation pattern;

extracting, as an index factor, information in a predetermined index from the collected information, wherein the predetermined index includes at least two indices;

calculating a score of the index as an index score based on the extracted index factor;

proposing, as a recommendation formation pattern, the formation pattern for which the index score has been calculated, when the calculated index score satisfies a predetermined condition;

when calculating the score, calculating the index score of at least two indices;

when at least two index scores satisfy the predetermined condition, proposing, as the recommendation formation pattern, the formation pattern for which the index score has been calculated;

wirelessly communicating with a vehicle controller mounted on the plurality of vehicles;

providing the proposed recommendation formation pattern to the vehicle controller;

receiving approval information which is transmitted from the vehicle controller in response to an operation of an approval button mounted on the plurality of vehicles and indicates that the recommendation formation pattern has been approved; and causing the vehicle controller mounted on the plurality of vehicles to perform platoon traveling control that controls at least one of acceleration, deceleration, or steering for causing the plurality of vehicles to travel according to the proposed recommendation formation pattern.

2. The platooning formation pattern proposal method according to claim 1, further comprising:

when a sum of the at least two index scores is maximum and also a difference between the at least two index scores is minimum, proposing the formation pattern for which the index score has been calculated as the recommendation formation pattern.

3. The platooning formation pattern proposal method according to claim 1, further comprising:

when a sum of the at least two index scores is maximum and also a difference between the at least two index scores is minimum, acquiring, as a solution of a combination optimization process, the formation pattern for which the index score has been calculated; and proposing the formation pattern for which the solution has been acquired, as the recommendation formation pattern.

4. The platooning formation pattern proposal method according to claim 1, wherein:

a fuel consumption index for prioritizing improvement of a fuel consumption, a request index for prioritizing a request condition of a vehicle participating in the platooning, a personnel cost index for prioritizing reduction in a personnel cost required for performing the platooning, or a safety index for prioritizing a safety during the platooning is set as the at least two indices, and the method further includes calculating the index score of the at least two indices among the fuel consumption index, the request index, the personnel cost index, and the safety index.

5. The platooning formation pattern proposal method according to claim 1, further comprising:

classifying the collected information into a target information group with a possibility of generating a platooning formation or a non-target information group with no possibility of generating the platooning formation, between collection of the information and calculation of the index score; and when calculating the index score, extracting, as the index factor, information in the predetermined index from the target information group, and calculating the score of the index as the index score based on the extracted index factor.

6. A platooning formation pattern proposal device for proposing a formation pattern of platooning when a plurality of vehicles perform the platooning, the device comprising:

at least one processor and memory configured to serve as:

an information collection unit configured to collect information related to the formation pattern;

an index score calculation unit configured to extract, as an index factor, information in a predetermined index from the information collected by the information collection unit, and calculate a score of the index as an index score based on the extracted index factor;

a formation pattern proposal unit configured to propose, as a recommendation formation pattern, the formation pattern of which index score has been calculated, when the index score calculated by the index score calculation unit satisfies a predetermined condition; and an external communication unit configured to:

wirelessly communicate with a vehicle controller mounted on the plurality of vehicles;

provide the proposed recommendation formation pattern to the vehicle controller; and receive approval information which is transmitted from the vehicle controller in response to an operation of an approval button mounted on the plurality of vehicles and indicates that the recommendation formation pattern has been approved;

wherein:

the at least one processor and memory are further configured to cause the vehicle controller mounted on the plurality of vehicles to perform platoon traveling control that controls at least one of acceleration, deceleration, or steering for causing the plurality of vehicles to travel according to the proposed recommendation formation pattern;

the index score calculation unit is further configured to calculate the index score of at least two indices; and the formation pattern proposal unit is further configured to propose, as the recommendation formation pattern, the formation pattern for which the index score has been calculated, when the at least two index scores satisfy the predetermined condition.

7. A platooning formation pattern proposal system for proposing a formation pattern of platooning when a plurality of vehicles perform the platooning, the system comprising:

at least one processor and memory configured to serve as:

an information collection unit configured to collect information related to the formation pattern;

an index score calculation unit configured to extract, as an index factor, information in a predetermined index from the information collected by the information collection unit, and calculate a score of the index as an index score based on the extracted index factor;

a formation pattern proposal unit configured to propose, as a recommendation formation pattern, the formation pattern of which index score has been calculated, when the index score calculated by the index score calculation unit satisfies a predetermined condition;

an external communication unit configured to:

wirelessly communicate with a vehicle controller mounted on the plurality of vehicles;

provide the proposed recommendation formation pattern to the vehicle controller; and receive approval information which is transmitted from the vehicle controller in response to an operation of an approval button mounted on the plurality of vehicles and indicates that the recommendation formation pattern has been approved; and a user terminal;

wherein:

the at least one processor and memory are further configured to cause the vehicle controller mounted on the plurality of vehicles to perform platoon traveling control that controls at least one of acceleration, deceleration, or steering for causing the plurality of vehicles to travel according to the proposed recommendation formation pattern;

the information collection unit is further configured to collect the information related to the formation pattern from the user terminal;

the index score calculation unit is further configured to calculate the index score of at least two indices; and the formation pattern proposal unit is further configured to propose, as the recommendation formation pattern, the formation pattern for which the index score has been calculated, when the at least two index scores satisfy the predetermined condition.

* * * * *